United States Patent Office 3,294,675
Patented Dec. 27, 1966

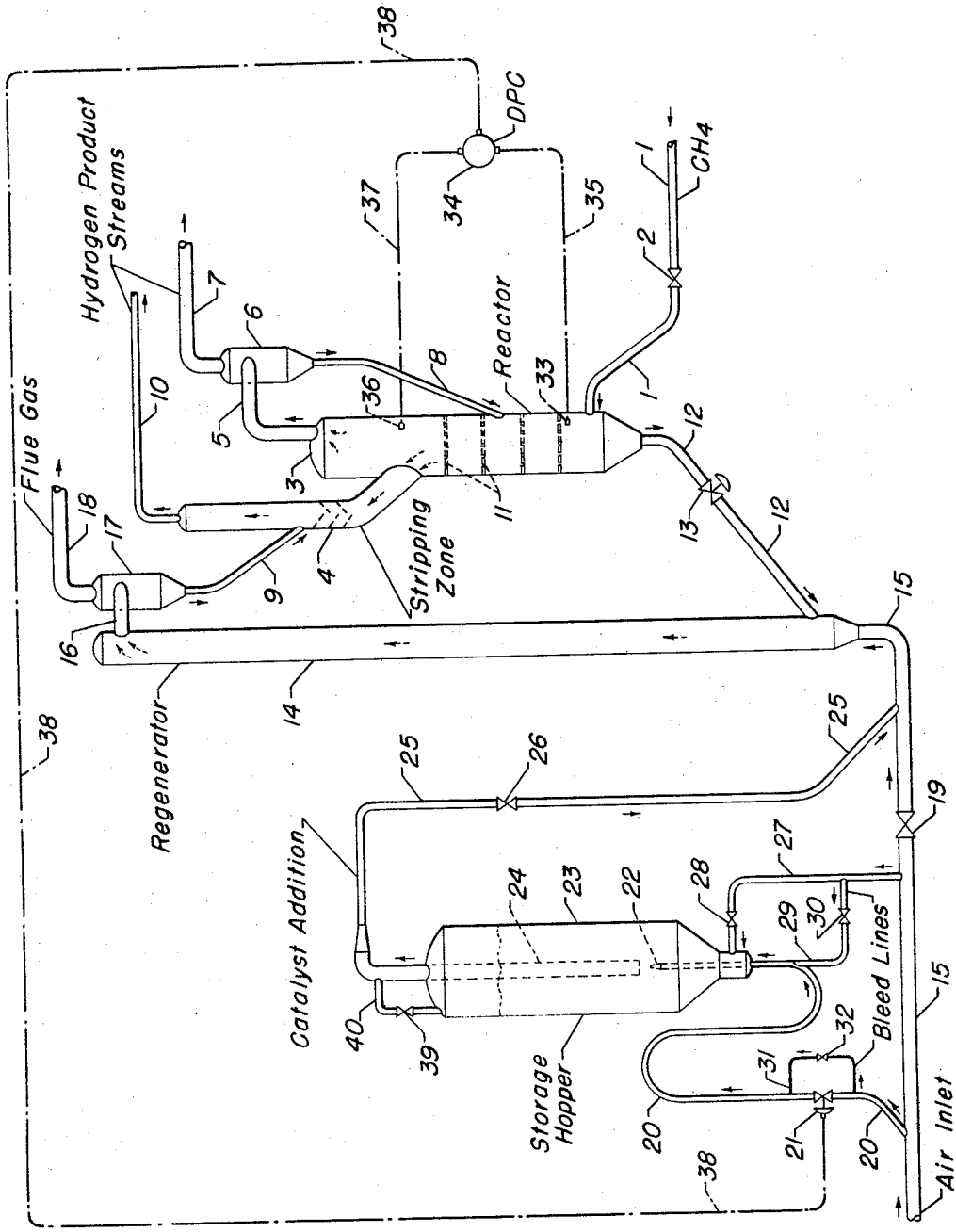

3,294,675
MEANS AND METHOD FOR AUTOMATIC ADDITION OF FINELY DIVIDED PARTICLES TO A FLUIDIZING CONTACTING SYSTEM
Frank H. Adams, Riverside, Ill., Leslie C. Hardison, Bloomer, Wis., and Paul J. Kuchar, Riverside, Ill., assignors to Universal Oil Products Company, Des Plaines, Ill., a corporation of Delaware
Filed May 20, 1964, Ser. No. 368,943
7 Claims. (Cl. 208—152)

The present invention relates to improved means for providing the automatic addition of finely divided particles to fluidized contacting system. More particularly, the invention is directed to the use of an automatic method for effecting the fluidized air lifting and transfer of catalyst particles from a storage zone into a fluidized system.

In any fluidized particle contacting system, as for example in the fluid catalytic cracking of hydrocarbons to provide high grade motor fuels and distillates, or in the fluidized catalytic decomposition of methane or other gaseous hydrocarbon to provide a high yield of hydrogen, there is a continuous loss of catalyst particles from the system by reason of entrainment of such particles with the product stream leaving the reaction zone and with a flue gas stream leaving the regeneration zone. Generally, manually controlled valve arrangements are used to make periodic additions of the catalyst particles to the particular unit. The one or more storage hoppers are provided with lower outlet valves such that a descending flow of catalyst particles can carry into a transfer line or into the air line to the regeneration zone for the fluidized transporting of such particles into the unit. Various problems have arisen in the past with catalyst addition procedures, particularly with respect to catalyst plugging in the valving means and with regard to controlling the rate of catalyst addition. Actually, most prior systems have not been arranged to permit automatic catalyst addition to the unit.

It is a principal object of the present invention to provide catalyst addition means which may be carried out automatically and will substantially preclude catalyst particles from contacting and plugging the primary control valve in the addition means.

It is also an object of the present invention to provide an apparatus arrangement in connection with the catalyst addition portion of a fluidized contacting system, such that there is a fluidized upflow of particles away from the particle addition control valve, as well as a special placement of the latter that will eliminate catalyst plugging from particles in a storage hopper.

Still another object of the present invention is to provide an automatic catalyst addition arrangement where the rate of addition is inversely responsive to a variation in catalyst inventory within the reaction zone.

Broadly, the present invention provides in a fluidized catalyst system, wherein finely divided catalyst particles are introduced into a reaction zone to effect the contacting and conversion of a charge stream therein, resulting contacted catalyst particles are subjected to a fluidized contact with an air stream being introduced into a separate regeneration zone, and regenerated catalyst particles are returned to the reaction zone for reuse therein, the improved method of adding catalyst particles to the system from a storage zone to replace losses from the system by reason of entrainment with a product stream leaving the reaction zone and a flue gas stream leaving the regeneration zone, which method comprises the steps of introducing a jet-like air stream upwardly into the lower portion of said storage zone containing fresh catalyst particles, entraining particles in said jet stream and carrying them in a fluidized confined column upwardly from said storage zone into a transfer line, and introducing the fluidized air-catalyst mixture from said transfer line into said regeneration zone to thereby add catalyst particles to said system.

In another embodiment, the present invention provides an apparatus arrangement for adding finely divided particles from a storage chamber into a fluidized particle contacting unit which comprises in combination, a vertically disposed particle storage chamber having a gas stream outlet nozzle positioned in the lower portion thereof to discharge substantially vertically upward, an open-ended riser conduit positioned internally within said chamber and having its lower end open and close to and in alignment with said nozzle whereby particles can be entrained into the riser line, a by-pass gas inlet conduit connecting said nozzle in said chamber to a reactant gas stream conduit extending to said particle contacting unit, an automatic motor-operated control valve in said by-pass inlet conduit, a particle transfer conduit extending from said riser conduit in said chamber to said gas stream conduit at a point downstream from the connection of the latter to said by-pass conduit, pressure differential measuring means in a contacting chamber of said fluidized particle contacting unit providing an indication of a varying amount of particles therein, and controller means connecting between said pressure differential measuring means and said automatic control valve to thereby vary gas flow rate therethrough inversely responsive to pressure changes in said contact chamber.

A particular advantage of the present improved particle addition system is the use of the air lift principle within a storage chamber such that there may be a fluidized column of particles carried outwardly from the chamber and into a gaseous reactant stream for introduction into the contacting unit.

Another advantageous feature resides in the use of a motor operated control valve in a line for bypassing air or other reactant gas stream such that the rate of the gas stream flow through the valve may be regulated automatically by sensing means in the reaction zone of the contacting unit. For example, as a method for determining the density and quantity of particles in a fluidized unit, pressure sensitive means within the upper and lower portions of the reaction chamber can be utilized to measure differential pressure in the chamber and such differential pressure in turn utilized to control the motor operated valve.

An improved apparatus arrangement for the fluidized transfer of particles from the storage chamber also utilizes bleed streams of air or other gaseous reactant being used to effect the fluidized transfer of particles, as well as remote positioning of the control valve to preclude any downflow of the catalyst particles from the storage zone into the gas inlet nozzle within the chamber that is effecting the fluidized lifting of particles into a riser line.

Reference to the accompanying drawing and the following description thereof will serve to more clearly set forth an embodiment of the improved automatic particle addition system, as well as point out additional advantages in connection therewith.

Referring now to the drawing, there is indicated diagrammatically a fluidized contacting unit suitable for the catalytic decomposition of a methane stream into hydrogen and carbon. Such catalytic decomposition is generally carried out at a high elevated temperature of the order of 1500° F. or higher and in the presence of a decomposition catalyst such as nickel on alumina, silica-alumina or other refractory metal oxide base material prepared in finely divided form, preferably microspheres in the 5 to 100 micron range.

Methane is introduced into the unit by way of line 1 having control valve 2 such that it may flow upwardly in reactor chamber 3 countercurrently to descending catalyst particles being introduced from an elevated stripping zone 4. The resulting hydrogen rich product stream is carried overhead from the reaction chamber 3 by way of outlet line 5, centrifugal catalyst separating means 6 and outlet line 7. Particles which are entrained with the product stream and removed by the centrifugal separator 6 are returned to the system by way of line 8. High temperature regenerated catalyst particles enter the upper portion of the stripping zone 4 by way of line 9 and are subjected to a carbon oxides removal and reducing step by virtue of a portion of hydrogen rich product stream being passed upwardly through the stripping zone 4 to the outlet line 10. The present embodiment indicates a plurality of perforate distributor grids 11 spaced vertically within the reactor chamber 3 such that there is redistribution and a plurality of dense phase fluidized contacting beds between the methane reactant stream and the catalyst particles.

Resulting carbon containing contacted catalyst particles are continuously withdrawn from the lower portion of reactor 3 by way of outlet line 12 and control valve 13 to be introduced into the lower end portion of a vertically elongated regenerating chamber 14. The latter receives an air or oxygen containing stream from line 15 and effects the fluidized lifting and contacting of the carbon containing particles throughout the height of the zone 14 to effect a controlled burning and removal of entrained carbon from the particles as well as reheating thereof to provide the endothermic heat for catalytic conversion of the methane stream in the reaction zone. Regenerated catalyst particles carry overhead from the vertically elongated column 14 by way of line 16, which in turn connects with a particle separator 17. The latter separates the transferred catalyst particles and returns them to the reaction zone by way of line 9 while the resulting flue gas stream carries overhead to suitable heat recovery or stack means, not shown, by way of line 18.

In accordance with the present invention, air flow to the regenerator 14 by way of line 15 is regulated by control valve 19 which in turn provides a controlled pressure in the line such that a portion of the air may be bypassed by way of line 20 and control valve 21 through an inlet nozzle 22 into the interior of the catalyst storage hopper 23. The latter is provided with a special open ended internal riser line 24 that is in alignment with the upper end of the nozzle 22, being spaced slightly therefrom such that finely divided particles may be entrained and lifted out of the lower portion of the storage hopper into a fluidized stream being carried by way of transfer line 25 with valve 26. The transfer line 25 may connect directly with one of the contacting chambers in the fluidized contacting unit; however, as indicated, line 25 may connect with the main air inlet conduit 15 such that fresh added catalyst is carried with the air stream into the lower end portion of the regenerator chamber to increase the inventory in the system.

In order to insure fluidity of the catalyst particles in the catalyst hopper, as well as preclude settlement of any of the particles down into the nozzle 22 or the lower end portion of the bypass line 20, there is indicated the use of a bleed line 27 with valve 28 and line 29 with valve 30 to connect respectively with the lower portion of the chamber 23 and the lower portion of the inlet nozzle section 22. Still another bleed line 31 with valve 32 is indicated around the control valve 21 such that catalyst particles are kept out of the control valve portion of the bypass line. In an alternate arrangement, a suitable control valve may be provided with a built-in bypass channel such that there is always a certain amount of air flowing through the valve, even when the latter is in a "closed" position, in which case the bleed lines 29 and 31 may be eliminated from the piping system.

The actual operation of the control valve in the bypass line 20 may be manual such that there is periodic addition of fresh catalyst from the storage hopper 23 into the fluidized contacting unit as it is deemed necessary to increase the inventory of the system. However, in accordance with the present invention, a preferred automatic addition system is provided with the catalyst air lift arrangement within the storage hopper 23 through the use of automatic pressure differential measuring means in a recreation chamber of the contacting unit. As indicated in the drawing, a pressure sensitive device 33 in the lower portion of reactor 3 connects with a differential pressure control apparatus 34 by way of line 35, while in addition an upper pressure sensitive device 36 connects through line 37 to the differential pressure control apparatus 34. The latter operating responsive to predetermined pressure differentials in the reactor can give an indication of changes in the quantity of fluidized particles retained therein. In other words, variations in bed density and/or depth of bed within the dense phase region of the lower portion of reactor 3 will be reflected in a varying pressure differential. Lesser quantities of catalyst will decrease the differential pressure and greater amounts of catalyst will increase the differential. Thus, the pressure controller 34 connecting by way of line 38 with the motor operated control valve 21 in bypass line 20 can in turn vary the air flow rate through the latter line into the storage hopper 23 inversely responsive to pressure differential measurements at controller 34. The operation of valve 21 may be effected by pneumatic operation through air control lines operated responsive to the pressure controller 34, or alternatively control valve 21 may be operated by electrically powered means responsive to a varying output provided by the controller 34. The term "motor operated" with respect to valve 21, as used herein, may encompass either pneumatic or electrically operated power means. The use of automatic sensing means for noting the catalyst inventory within the reactor chamber 3 as well as the use of flow control means in the bypass air line 20 to in turn effect an automatic fluidized air-lift addition of catalyst particles to the contacting unit is of particular advantage in effecting an accurately controlled method of maintaining a predetermined amount of inventory and at the same time eliminate misoperations that may happen through manually controlled additions of catalyst. Fresh catalyst additions can be made more or less continuously or at intermittent intervals responsive to a preset pressure differential reading from controller 34.

The present illustrated embodiment shows a single storage hopper 23; however, a plurality of hoppers or storage chambers and particle addition systems may be utilized in connection with any one unit, particularly where a high inventory of catalyst is required in a large capacity conversion system. It is not intended to limit the construction of the storage chamber to any one type, although preferably the chambers, such as 23, are of a closed type capable of maintaining pressure and, in addition, a control valve means, such as 39 in line 40, is provided to equalize pressure in the top of the storage zone, or such that there may be a controlled low pressure build-up within the storage hopper where desired for rapid catalyst addition purposes. No apparatus or piping is illustrated in the present embodiment for filling the storage hopper 23; however, conventional vacuum or pneumatic loading systems may be combined with each storage hopper to effect the transfer of catalyst particles from freight cars or other supply sources.

A preferred piping and apparatus arrangement in the zone of the storage hopper also embodies a U bend or downflow section in the air bypass line to the gas inlet nozzle 22, such that the control valve portion 21 may be at a point remote from the lower end of the inlet nozzle portion of the system. Thus, finely divided particles may more readily be kept away from the zone of the valve and particle plugging substantially precluded from in any way interferring with the automatic operation of the system. Generally, suitable bleed line arrangements will prevent finely divided particles from descending into a nozzle inlet line or other valve means; however, the remote location insures the absence of finely divided particles where there may be settling after a power failure and temporary loss of air stream pressure.

It should be realized that the methane decomposition conversion system indicated in connection with the present embodiment is merely illustrative and that other types of fluidized units may well be incorporated with the particle addition system of the present invention. For example, fluidized dehydrogenation or fluidized coking operations, as well as the aforementioned fluidized catalytic cracking operation may well embody catalyst or finely divided particle conversion systems which can advantageously utilize the improved automatic particle addition system to a particular advantage.

We claim as our invention:

1. In a fluidized catalyst system wherein finely divided catalyst particles are introduced into a reaction zone to effect the contacting and conversion of a charge stream therein, resulting contacted catalyst particles are subjected to a fluidized contact with an air stream being introduced into a separate regeneration zone, and regenerated catalyst particles are returned to the reaction zone for reuse therein, the improved method of adding catalyst particles to the system from a storage zone to replace losses from the system by reason of entrainment with a product stream leaving the reaction zone and a flue gas stream leaving the regeneration zone, which method comprises the steps of introducing a jet-like air stream upwardly into the lower portion of said storage zone containing a bed of fresh catalyst particles, entraining particles in said jet stream and carrying them in a fluidized confined column upwardly from said storage zone into a transfer line, allowing the level of said bed of catalyst particles within the storage zone to vary over substantial vertical limits but not lower than the base of said fluidized confined column, and introducing the fluidized air-catalyst mixture from said transfer line into said regeneration zone to thereby add catalyst particles to said system.

2. In a fluidized catalyst system wherein finely divided catalyst particles are introduced into a reaction zone to effect the contacting and conversion of a charge stream therein, resulting contacted catalyst particles are subjected to a fluidized contact with a principal air stream being introduced into a separate regeneration zone, and regenerated catalyst particles are returned to the reaction zone for reuse therein, the improved method of adding catalyst particles to the system from a storage zone containing a bed of catalyst particles to replace losses from the system by reason of entrainment with a product stream leaving the reaction zone and a flue gas stream leaving the regeneration zone, which method comprises, by-passing a portion of said principal air stream passing to said regeneration zone in an amount regulated as hereinafter set forth and introducing it as jet-like stream upwardly into the catalyst particles in the lower end portion of said storage zone, entraining particles with said air jet stream and carrying them in a confined fluidized column upwardly and outwardly from said storage zone, allowing the level of said bed of catalyst particles within the storage zone to vary over substantial vertical limits but not lower than the base of said fluidized confined column, subsequently introducing such entrained particles into the principal air stream carrying to said regeneration zone to thereby add a controlled quantity of catalyst particles to said system, and regulating the flow rate of the said by-passed controlled portion of air stream to said storage zone indirectly responsive to variations in the catalyst inventory within said reaction zone.

3. The method of claim 2 further characterized in that pressure measurements are made in the upper and lower portions of said reaction zone of said system and pressure differential measurements therebetween provide an automatic indication of the amount of catalyst inventory therein and provide through control and valving means the automatic regulation of the amount of air being passed to said storage zone responsive to said inventory.

4. Apparatus for adding finely divided particles from a storage chamber into a fluidized particle contacting unit, which comprises in combination, a vertically disposed particle storage chamber having a gas stream outlet nozzle positioned in the lower portion thereof to discharge substantially vertically upward, an open-ended riser conduit positioned internally within said chamber and having its open lower end close to and in alignment with said nozzle whereby particles can be entrained into the riser line, a by-pass gas inlet conduit connecting said nozzle in said chamber to a reactant gas stream conduit extending to said fluidized particle contacting unit, an automatic motor-operated control valve in said by-pass inlet conduit, a particle transfer conduit extending from said riser conduit in said chamber to said gas stream conduit at a point downstream from the connection of the latter to said by-pass conduit, pressure differential measuring means connective with a contacting chamber of said fluidized particle contacting unit and providing an indication of a varying amount of particles therein, and controller means connecting between said pressure differential measuring means and said automatic control valve to thereby vary the gas flow rate therethrough responsive to changes in pressure in said contacting chamber.

5. The apparatus of claim 4 further characterized in that a pressure equalizing line with valve therein connects between the upper portion of said storage chamber to said particle transfer conduit to thereby provide a rapid control pressure in the upper portion of such chamber.

6. The apparatus of claim 4 further characterized in that a U bend section is provided in said by-pass inlet conduit and said control valve therein is in a portion of the conduit upstream from the U bend section.

7. The apparatus of claim 4 further characterized in that a gas stream bleed line is provided between said gas stream conduit to said nozzle and said reactant gas stream conduit whereby a controlled small quantity of gas precludes the plugging of said nozzle with particles from within said storage chamber.

References Cited by the Examiner
UNITED STATES PATENTS

| | | | |
|---|---|---|---|
| 2,601,676 | 6/1952 | Trainer et al. | 208—164 |
| 2,902,432 | 9/1959 | Codet et al. | 208—164 |
| 2,905,635 | 9/1959 | Harper | 208—164 |
| 3,001,931 | 9/1961 | Osbourne | 208—164 |

DELBERT E. GANTZ, *Primary Examiner.*

HERBERT LEVINE, *Examiner.*